Aug. 18, 1959 K. S. STULL, JR 2,900,457

WIDE BAND AMPLIFIER INCLUDING BANDWIDTH SWITCHING APPARATUS

Filed July 18, 1957

United States Patent Office 2,900,457 Patented Aug. 18, 1959

2,900,457

WIDE BAND AMPLIFIER INCLUDING BAND-WIDTH SWITCHING APPARATUS

Keefer S. Stull, Jr., Baltimore, Md., assignor to Westinghouse Electric Corporation, East Pittsburgh, Pa., a corporation of Pennsylvania Application July 18, 1957, Serial No. 672,822

6 Claims. (Cl. 179—171)

This invention relates to bandwidth switching apparatus and more particularly to apparatus for simply switching between a wide-band frequency response and a narrow-band frequency response.

It is often desirable to change the bandwidth of radio frequency amplifying apparatus for different input signals. Prior art circuits and apparatus for accomplishing this are characterized by a number of disadvantages. Some prior art circuits require the use of complicated mechanical or electrical switching methods and the duplication or variation of many tuned networks.

The apparatus of the instant invention overcomes these and other disadvantages of the prior art by providing a circuit in which switching between a broad bandwidth and a narrow bandwidth is accomplished by one single-pole, double-throw switch or relay in a plate supply lead, permitting use of a switch which may be remotely located if desired. While the switch is in one position, a portion of the circuit having wide-band networks is energized; while the switch is in the other position, a portion of the circuit having narrow-band networks is energized and the signal through the circuit is required to pass through narrow-band networks and filters. The same wide-band amplifiers may be used regardless of which of the above-described portions of the circuit is used.

Accordingly, a primary object of the invention is to provide new and improved bandwidth switching apparatus.

Another object is to provide new and improved bandwidth switching apparatus for switching between broad and narrow frequency band responses.

A further object is to provide a new and improved bandwidth switching circuit utilizing a single-pole, double-throw switch for changing from wide-band frequency response to narrow-band frequency response.

Still a further object is to provide new and improved bandwidth switching apparatus in which the switching may be accomplished by means located remote from the remainder of the apparatus.

Figure 1:
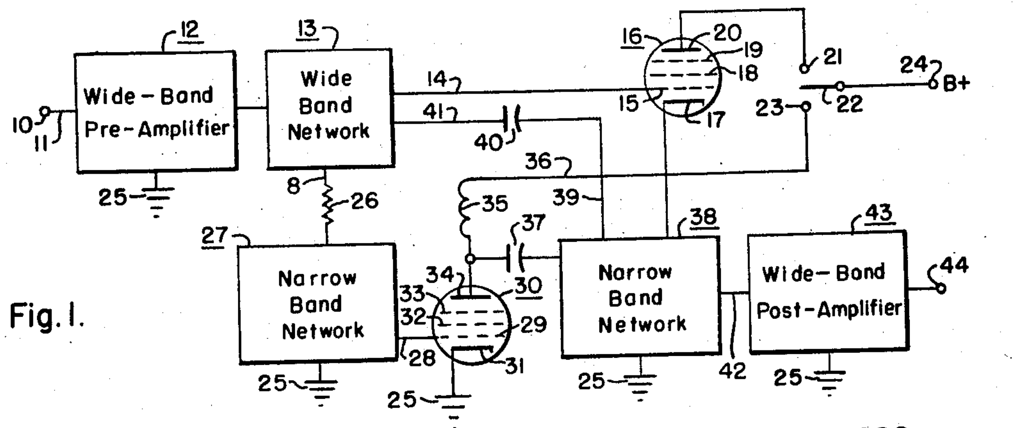
Figure 2:
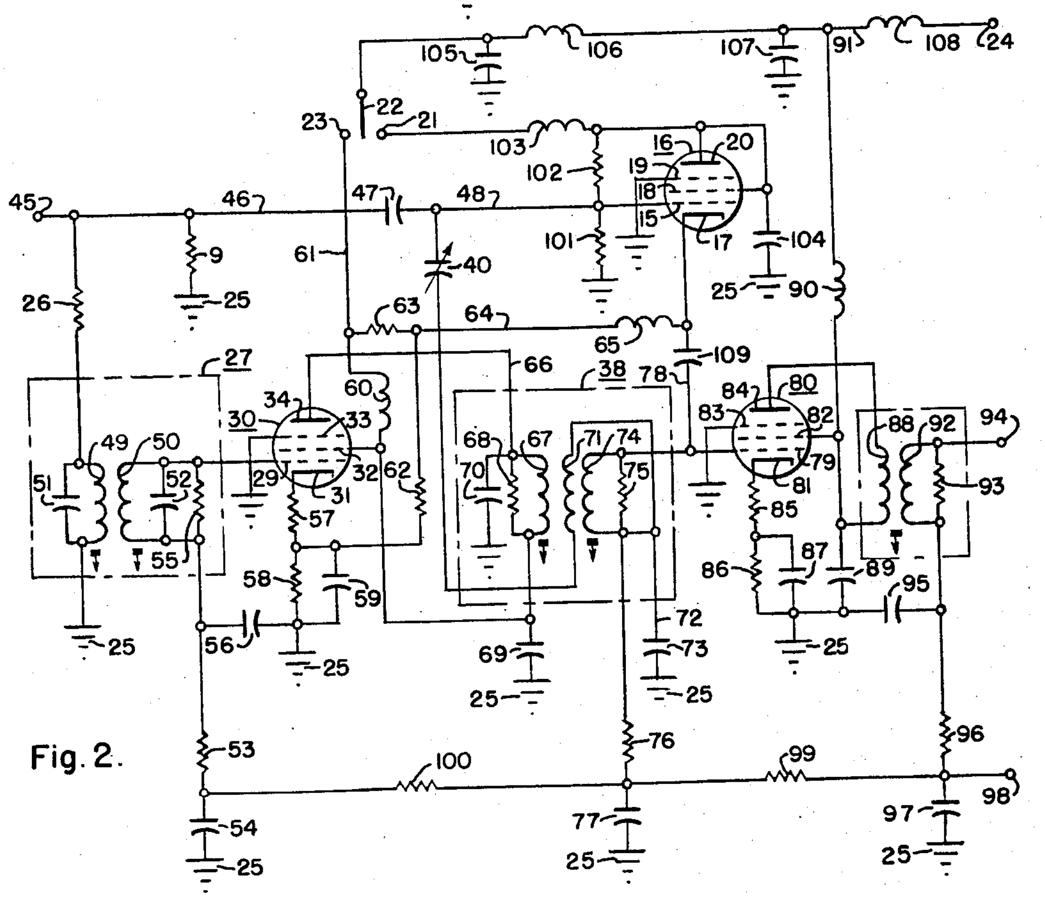

Other objects and advantages will become apparent after a study of the following specification when read in connection with the accompanying drawings, in which:

Fig. 1 is a simplified electrical circuit diagram, largely in block form, of apparatus according to one embodiment of the invention; and Fig. 2 is a schematic electrical circuit diagram of apparatus according to the preferred embodiment of the invention.

Referring now to the drawing for a more completely understanding of the invention, in which like reference numerals are used throughout to designate like parts and in particular to Fig. 1 thereof, there is shown at 10 an input terminal connected by way of lead means 11 to a wide-band pre-amplifier generally designated 12. The output of the pre-amplifier 12 is applied to a wide-band network 13. One output of the wide-band network 13 is applied by way of lead 14 to the control grid 15 of a cathode follower which may be of the pentode type triode connected and is generally designated 16, pentode 16 having in addition to the aforementioned control grid 15, a cathode 17, screen and suppressor grids 18 and 19, respectively, and an anode 20. The anode 20 is connected to contact 21 of a single-pole, double-throw switch having arm 22 and an additional contact 23 which is provided for purposes to be hereinafter made more clearly apparent. The arm 22 is connected to the positive terminal 24 of a suitable source of potential, not shown, the negative terminal of the source of potential being connected to ground 25.

An additional output from the aforementioned wide-band network 13 is applied by way of lead 8 to a resistor 26 forming part of a narrow-band network, and thence to the remainder of the narrow-band network shown in block form and generally designated 27, the output from the narrow-band network or filter 27 being applied by way of lead 28 to the control grid 29 of a pentode generally designated 30, the pentode 30 also having a cathode 31, screen and suppressor grids 32 and 33 and an anode 34. The aforementioned cathode 31 is connected to the aforementioned ground 25, and the aforementioned anode 34 is connected by way of a choke 35 and lead 36 to the aforementioned switch terminal or contact 23. The output of the pentode 30 is coupled by way of capacitor 37 to a normally narrow-band filter or network, shown in block form and generally designated 38. The output of the narrow-band network 38 is applied by way of lead 42 to a wide-band post-amplifier generally designated 43. The output of the amplifier 43 is delivered at terminal 44. Narrow-band network 38 is also connected to the aforementioned cathode 17 of cathode follower 16.

As will be readily understood by those skilled in the art, the grid-cathode capacitance of the cathode follower 16 provides a signal leakage path between wide-band network 13 and narrow-band network 38 while the apparatus is in its narrow-bandpass condition. To compensate for or eliminate this leakage which would interfere with the desired narrow-band frequency response, an out-of-phase voltage of equal amplitude is obtained from either wide-band network 13 or narrow-band network 38 and fed back by way of lead 39, neutralizing capacitor 40, and lead 41, in a manner to neutralize the leakage through cathode follower 16.

In the operation of the apparatus of Fig. 1, let it be first assumed by way of description that the apparatus is to be used in its narrow-bandpass condition, that the switch arm 22 is in its lower position making contact with 23, and that plate voltage is applied by way of lead 36 and choke 35 to the anode 34 of pentode 30. At the same time, no plate voltage is applied to the cathode follower 16. While the switch arm 22 is in the lower position, the signal at input terminal 10 passes through the wide-band pre-amplifier 12, through the wide-band network 13, through resistor 26, through narrow-band network 27 and to pentode 30 where it is amplified and passed through the narrow-band network 38 and a wide-band amplifier 43 to output terminal 44. As aforementioned, since an additional leakage path from network 13 to network 38 is provided through the cathode-control grid capacitance of pentode 16, a neutralizing voltage is obtained, for example, from network 38 and applied to network 13 by way of lead 39, capacitor 40, and lead 41, of the proper phase and amplitude to neutralize the leakage through the pentode 16.

Assume now by way of description that it is desired to utilize the wide-band response of the apparatus and that the switch arm 22 is moved to its upper position making contact with 21. While the switch arm 22 is in its upper position as viewed in Fig. 1, plate potential is applied to the anode 20 of pentode 16 but is not applied to the pentode 30. In a manner which will be made hereinafter more clearly apparent, the low dynamic output impedance of the cathode follower 16 now loads the normally narrow-band network 38 making it a wide-band network. The input signal on lead 11 now passes through wide-band pre-amplifier 12, wide-band network 13, cathode follower 16, network 38, and wide-band post-amplifier 43 to output terminal 44. While the signal is passing through the wide frequency band channel of the apparatus, any signal leakage through the grid-plate capacitance of the narrow-band pentode amplifier 30 is negligible. The aforementioned resistor 26 is made large enough to prevent the remainder of the narrow-band network 27 from interacting in an undesirable fashion on the wide-band network 13, as will be readily understood by those skilled in the art.

Particular reference should be made now to Fig. 2 in which a detailed schematic electrical circuit diagram of the preferred embodiment of the apparatus is shown, differing in some details from Fig. 1. Input terminal 45 of Fig. 2 may correspond to the output of a single-ended wide-band network at 13, in which leads 8, 14 and 41 are tied together. Terminal 45 is connected by way of lead 46 to a coupling capacitor 47, capacitor 47 being connected by way of lead 48 to the control grid 15 of the pentode cathode follower 16 aforementioned. Assuming for the purposes of description that terminal 45 is connected to an input cable, preferably lead 46 has a resistor 9 connected therefrom to ground 25 to properly terminate the cable; lead 46 is also connected by way of the aforementioned resistor 26 to supply an input to the aforementioned narrow-band network 27, details of which are shown in Fig. 2. The narrow-band network 27 is seen to include, for example, a double-tuned transformer which is typically composed of separately tuned primary and secondary windings 49 and 50, respectively, windings 49 and 50 having capacitors 51 and 52 connected thereacross respectively. One terminal of winding 49 is connected to the aforementioned resistor 26 and the other terminal of winding 49 is connected to ground 25. The lower terminal of the aforementioned secondary 50 is connected by way of resistor 53 and capacitor 54 to ground 25, while the upper terminal of winding 50 is connected to the aforementioned control grid 29 of pentode 30. Preferably, the windings are transitionally-coupled and means such as movable slugs or cores may be employed for tuning the windings separately. Secondary winding 50 has resistor 55 connected thereacross. The aforementioned lower terminal of secondary 50 is further connected by way of capacitor 56 to aforementioned ground 25. The aforementioned cathode 31 is connected by way of series-connected resistors 57 and 58 to ground 25. The aforementioned suppressor grid 32 is connected to ground 25. Resistor 58 has capacitor 59 connected thereacross. The aforementioned screen grid 32 is connected by way of choke 60 and lead 61 to aforementioned switch terminal 23. The junction between resistors 57 and 58 is connected by way of series-connected resistors 62 and 63 to the aforementioned lead 61. The junction between the aforementioned resistors 62 and 63 is connected by way of lead 64 and choke 65 to the aforementioned cathod 17 of pentode 16.

The aforementioned anode 34 of pentode 30 is connected by way of lead 66 to one terminal of a transformer primary 67, primary 67 having resistor 68 connected thereacross, the other terminal of primary 67 being connected to screen grid 32 and by way of capacitor 69 to ground 25. The aforementioned lead 66 is also connected by way of capacitor 70 to ground 25. Associated with the primary winding 67 is a secondary winding 74 having resistor 75 in shunt therewith, one terminal of secondary 74 being connected to lead 72 and also connected by way of series-connected resistor 76 and capacitor 77 to ground 25. The other terminal of the secondary 74 is connected by way of lead 78 to the control grid 79 of a pentode generally designated 80, pentode 80 also having a cathode 81, screen grid 82, suppressor grid 83 and anode 84. The transformer including primary 67 and secondary 74 has a tertiary bifilar winding 71 coupled to secondary 74 for obtaining a voltage out of phase with the voltage in secondary 74 for neutralizing leakage through the cathode follower 16, one terminal of tertiary winding 71 being connected to the aforementioned neutralizing capacitor 40, the other terminal of winding 71 being connected by way of lead 72 and capacitor 73 to ground 25.

Aforementioned suppressor grid 83 of tube 80 is connected to ground 25. Cathode 81 is connected by way of series-connected resistors 85 and 86 to ground 25, resistor 86 having capacitor 87 connected in parallel therewith. The aforementioned anode 84 is connected to one terminal of the primary 88 of a transformer, the other terminal of primary 88 being connected by way of capacitor 89 to ground 25, the junction between primary 88 and capacitor 89 being connected to the aforementioned screen grid 82 and being also connected by way of a choke 90 to a lead 91. The secondary 92 associated with and coupled to primary 88 has a resistor 93 connected in shunt therewith, one terminal of secondary 92 being connected to output terminal 94, the other terminal of secondary 92 being connected by way of capacitor 95 to ground 25 and also being connected by way of series-connected resistor 96 and capacitor 97 to ground 25. The junction between resistor 96 and capacitor 97 is connected to a terminal 98 which is adapted to receive an automatic gain control voltage, in a manner which will be readily understood by those skilled in the art. Terminal 98 is connected by way of resistor 99 to the junction between resistor 76 and capacitor 77 and is thence connected by way of resistor 100 to the junction between resistor 53 and capacitor 54.

Paying particular attention now to the circuit portions closely associated with the aforementioned pentode 16, it will be noted that the aforementioned control grid 15 is connected by way of resistor 101 to ground 25 and is also connected by way of resistor 102 to anode 20. Anode 20 is connected by way of choke 103 to the aforementioned switch terminal 21. Anode 20 is also connected to screen grid 18 and by way of capacitor 104 to ground 25.

The aforementioned switch arm 22 is connected by way of capacitor 105 to ground 25, and the junction between the switch arm 22 and capacitor 105 is connected by way of choke 106 to the aforementioned lead 91, lead 91 having capacitor 107 connected therefrom to ground 25, lead 91 being connected by way of choke 108 to the aforementioned B+ terminal 24.

Aforementioned cathode 17 is connected by way of capacitor 109 to aforementioned lead 78.

The operation of the circuit of Fig. 2 will be readily understood in view of the hereinabove description of the operation of the circuit of Fig. 1. The three resistors 63, 62 and 58 provide a voltage divider arrangement when the switch arm 22 is making contact with 23. Lead 64, which is connected to the junction between resistors 63 and 62 provides a positive bias to the cathode 17 of the cathode follower 16 to keep the cathode follower 16 cutoff during narrow-band operation, that is, while the switch arm 22 is in its left position as viewed in Fig. 2 and making contact with 23. During wide-band operation when switch arm 22 is making contact with 21, the output of the cathode follower 16 is coupled by way of capacitor 109 to the aforementioned lead 78, which is connected to the aforementioned control grid 79 of pentode 80. During wide-band operation, resistor 63 will supply a small plate and screen voltage to the narrow-band amplifier from the cathode 17 of the cathode follower 16. However, by returning the direct current cathode follower load including the resistor 62 to the cathode circuit of the narrow-band amplifier 30, a positive bias is developed across the aforementioned resistor 58 which keeps the narrow-band amplifier 30 cutoff applied withstanding the small screen and plate voltage applied thereto.

During narrow-band operation, the only substantial cathode follower circuit load on the secondary 74 is that provided by the losses in the cathode radio frequency choke 65 which are negligible. However, during wide-band operation, the low dynamic output impedance of the cathode follower, which may be in the order of 125 ohms, loads the secondary 74 to give a very wide bandwidth. The normally narrow-band network including coils or windings 67, 71 and 74 is preferably of the unequal Q type with a low primary Q so that the primary does not act as a trap coupled to the secondary during wide-band operation.

As explained in connection with Fig. 1, the neutralizing capacitor 40 provides an out-of-phase voltage to neutralize leakage through the cathode follower 16 while the narrow-band channel of the circuit is operative.

It should be understood that all of the narrow-band networks radio frequency transformers shown, have, as stated before, primary and secondary windings of the separately tunable type to provide the desired response and amplification characteristics.

There has been provided then bandwidth switching apparatus well suited to accomplish the hereinbefore stated objectives of the invention. The circuit shown has the additional advantage of allowing one post-amplifier 43 to perform the work of two amplifiers at the cost of only two additional tubes and networks plus a small number of associated components, as shown in Fig. 2.

Whereas the invention has been shown and described with reference to two embodiments thereof which give satisfactory results, it should be understood that modifications may be made and equivalents substituted without departing from the spirit and scope of the invention.

I claim as my invention:

1. Bandwidth switching apparatus comprising, in combination, a first wide-band amplifier, a second wide-band amplifier, wide-band frequency response network means including a normally de-energized cathode follower operatively connecting the output of the first wide-band amplifier to the input of the second wide-band amplifier, narrow-band network means including a normally de-energized electron discharge tube connected in parallel with said wide-band network means and coupling the output of the first wide-band amplifier to the input of the second wide-band amplifier, switching means for selectively energizing the wide-band network and the narrow-band network means, and means operatively connected between the wide-band network and the narrow-band network means for neutralizing the leakage of unwanted signal energy through the wide-band network means while the narrow-band network means is selectively energized.

2. Bandwidth switching apparatus comprising, in combination, a first wide-band amplifier, a second wide-band amplifier, wide-band network coupling means including a cathode follower coupling the output of the first wide-band amplifier to the input of the second wide-band amplifier, narrow-band network coupling means connected in parallel with said wide-band network coupling means and also coupling the output of the first wide-band amplifier to the input of the second wide-band amplifier, said narrow-band network coupling means including an electron discharge tube, switching means connected to both the cathode follower and the electron discharge tube for selectively energizing the cathode follower and the electron discharge tube in accordance with the setting of the switching means, and feedback means connecting the narrow-band network coupling means to the wide-band network coupling means, said feedback means being constructed and arranged for feeding back energy of the proper phase and amplitude to neutralize signal leakage through said cathode follower while said electron discharge tube is energized.

3. Bandwidth switching apparatus comprising, in combination, first and second wide frequency band response devices, said first wide-band response device being adapted to have an input signal applied thereto, cathode follower means having a signal applied thereto from said first wide-band response device, first and second narrow-band networks, said first narrow-band network also having a signal applied thereto from said first wide-band response device, amplifier means operatively connecting the output of the first narrow-band network to the input of the second narrow-band network, said cathode follower means being operatively connected to said second narrow-band network whereby the signal passing through said cathode follower means also passes through said second narrow-band network, said cathode follower means while energized applying a substantial load across said second narrow-band network, said second narrow-band network being constructed and arranged whereby said load broadens the response of the network, said second narrow-band network supplying a signal to said second wide frequency band response device, and switching means for selectively energizing said cathode follower means and said amplifier means to thereby provide an overall wide-band response or an overall narrow-band response for the apparatus.

4. Bandwidth switching apparatus comprising, in combination, first and second wide-band frequency responsive devices, cathode follower means operatively connected to said first wide-band device for receiving a signal therefrom, first and second narrow-band networks, said first narrow-band network operatively connected to said first wide-band device for receiving a signal therefrom, signal transmission means operatively connecting the output of said first narrow-band network to the input of said second narrow-band network, said cathode follower means operatively connected to said second narrow-band network so that the signal passing through said cathode follower means also passes through said second narrow-band network, said cathode follower while energized applying a substantial load across said second narrow-band network, said second narrow-band network response to said load to broaden the response of the network, said second narrow-band network operatively connected to said second wide-band device for applying a signal thereto, and switching means for selectively energizing said cathode follower means and said signal transmission means to thereby provide an overall wide-band response or an overall narrow-band response for the apparatus.

5. Bandwidth switching apparatus comprising, in combination, a wide-band frequency response device, an output means, cathode follower means operatively connected to said wide-band device for receiving a signal therefrom, first and second narrow-band networks, said first narrow-band network operatively connected to said wide-band device for receiving a signal therefrom, a signal transmission means operatively connecting the output of said first narrow-band network to said second narrow-band network, said cathode follower means being operatively connected to said second narrow-band network so that the signal passing through said cathode follower means also passes through said second narrow-band network, said cathode follower means while energized applying a substantial load across said second narrow-band network, said second narrow band network being responsive to said load to broaden the response of the network, said second narrow-band network operatively connected to said output means for applying the signal thereto and switching means for selectively energizing said cathode follower means and said signal transmission means to thereby provide an overall wide-band response or an overall narrow-band response for the apparatus.

6. Bandwith switching apparatus comprising, in combination, a wide-band frequency response device, output means, a first signal transmission means operatively connected to said wide-band frequency response device for receiving a signal therefrom, first and second narrow-band networks, said first narrow-band network operatively connected to said wide-band device for receiving a signal therefrom, a second signal transmission means operatively connecting the output of said first narrow-band network to the input of said second narrow-band network, said first signal transmission means being operatively connected to said second narrow-band network so that the signal passing through said first signal transmission means also passing through said second narrow-band network, said first signal transmission means while energized applying a substantial load across said second narrow-band network, said second narrow band network responsive to said load to broaden the response of the network, said second narrow-band network operatively connected to said output means for applying a signal thereto, and switching means for selectively energizing said first signal transmission means and said second signal transmission means to thereby provide an overall wide-band response or an overall narrow-band response for the apparatus.

References Cited in the file of this patent

UNITED STATES PATENTS

| | | |
|---|---|---|
| 2,280,563 | Weinberger | Apr. 21, 1942 |
| 2,498,561 | Lipkin | Feb. 21, 1950 |
| 2,579,345 | Sziklai | Dec. 18, 1951 |
| 2,774,043 | Villard | Dec. 11, 1956 |
| 2,796,469 | Papouschek | June 18, 1957 |